(12) United States Patent
Pucar Rimhagen et al.

(10) Patent No.: US 8,190,136 B2
(45) Date of Patent: May 29, 2012

(54) INITIATING TRACING OF WIRELESS TERMINAL ACTIVITIES

(75) Inventors: Anna Pucar Rimhagen, Motala (SE); Robert Petersen, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 341 days.

(21) Appl. No.: 12/528,836

(22) PCT Filed: Feb. 27, 2007

(86) PCT No.: PCT/SE2007/000183
§ 371 (c)(1), (2), (4) Date: Aug. 27, 2009

(87) PCT Pub. No.: WO2008/105689
PCT Pub. Date: Sep. 4, 2008

(65) Prior Publication Data
US 2010/0048188 A1  Feb. 25, 2010

(51) Int. Cl.
*H04L 29/06* (2006.01)

(52) U.S. Cl. ............ 455/414.3; 455/418; 455/445
(58) Field of Classification Search .......... None
See application file for complete search history.

(56) References Cited

U.S. PATENT DOCUMENTS
2004/0121775 A1* 6/2004 Ropolyi et al. ........... 455/445

FOREIGN PATENT DOCUMENTS
WO  WO 2007103616 A2  9/2007
* cited by examiner

*Primary Examiner* — Erika Gary

(57) ABSTRACT

The invention is directed to a method and an access network management device for initiating a tracing of the activities of a wireless terminal in a wireless network as well as to a method and a core network management device for ordering a tracing of the activities of a wireless terminal in a wireless network. According to the invention an access network management device in an access network section (AN) of a wireless network (WN) sends a request for a tracing regarding a wireless terminal to a core network management device in a core network section (CN) of the wireless network (WN). The core network management device automatically orders, based on the request, network elements of the access network section (AN) to perform tracing regarding the wireless terminal.

18 Claims, 3 Drawing Sheets

INITIATING TRACING OF WIRELESS TERMINAL ACTIVITIES

This application is a National Stage of International Application No. PCT/SE2007/000183, filed Feb. 27, 2007, the disclosure of which is incorporated herein by reference.

TECHNICAL FIELD OF THE INVENTION

The present invention relates to the field of tracing the activities of wireless terminals in wireless networks. The invention more particularly relates to a method and an access network management device for initiating a tracing of the activities of a wireless terminal in a wireless network as well as to a method and a core network management device for ordering a tracing of the activities of a wireless terminal in a wireless network.

DESCRIPTION OF RELATED ART

In a typical cellular radio system, wireless terminals in the form of mobile user equipment units (UEs) communicate via a radio access network (RAN) section to one or more core network sections of a wireless network. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with a radio access network.

The radio access network (RAN) section covers a geographical area which is divided into cell areas, with each cell area being served by a wireless access point handling device. A cell is a geographical area where radio coverage is provided by the wireless access point handling device, which wireless access point handling device in some networks, like GSM, UMTS and LTE, is provided as radio base station equipment at a base station site. This wireless access point handling device is a network element that provides a wireless access point in the form of an air interface (e.g., radio frequencies) for communication with the wireless terminals within range of the access point. In the radio access network the end connectivity to the wireless terminal is performed. In UMTS (Universal Mobile Telecommunications) and GSM (Global System for Mobile communications) a base station is connected to another network element in the form of a radio network controller (RNC) or a base station controller (BSC) in the radio access network section, while in other types of networks, like LTE (Long Term Evolution), the functionality of the radio network controller is provided in the access point itself. In LTE networks the access point handling device is named eNodeB (Evolved NodeB). The network elements in the radio access network do in turn communicate with connection setup devices in a core network section of the wireless network, which in the case of UMTS and GSM is an MSC (Mobile Services Switching Centre), which sets up connections between user equipment units and other terminals or other user equipment units or other networks. In LTE the corresponding network elements are typically based on elements such as routers.

The different network elements in the core network section and access network section are furthermore managed by various network management devices. This may be done in order to monitor the functionality of the elements in the network in order to for instance detect faults and provide servicing of the network elements. The network management devices are often separated for the access network section and the core network section, but can also be combined.

In the core network section there are furthermore often low level core network management devices, which are often called SNM (Sub Network Manager), NEM (Network Element Manager) or EMS (Element Management System). Normally one low level core network management device will handle network elements provided by one, single supplier. This means that an operator of a wireless network that has several network element suppliers, i.e. an operator operating in a multi-supplier environment will have several, separate low level core network management devices. On top of the low level core network management device, in the core network section, there is normally provided a high level core network management device. This device is often termed NMC (Network Management Center). The high level core management device is multi-supplier and provided on a network level, and has a higher abstraction level than the low level core network management devices. It coordinates data from several low level core network management devices.

In the access network section there is also one or more access network management devices that are similar to the low level core network management devices. The only difference between the access network management devices and the low level core network management devices, apart from the obvious differences resulting because of the different nature of the network elements they are serving, is in many aspects only the network section they are provided in. Therefore the same terminology is normally used for the access network management devices and the low level core network management devices.

It is in many cases of interest to trace the activities of wireless terminals. This may be of interest in order to see if the network is functioning properly for a wireless terminal. When the activities of a wireless terminal are traced, the wireless terminal is followed through the network and all relevant messages and data are logged along the way. This data gives valuable input regarding how well the network operates, and also information for trouble shooting.

Typical data that could be logged is information about the speech quality and events that have occurred along the way (like a dropped call or a handover).

Today such tracing is initiated in the core network and then typically by a core network management device. Such a tracing can then be ordered by an operator of a low level core network management device or a high level core management device. In the ordering of such a tracing a wireless terminal or a subscriber identity associated with the wireless terminal is specified, together with other types of data, like for example:

which parts of the network where the tracing shall be carried out (e.g. in the whole network, or in a region) and trace depth (i.e. which data and messages shall be logged)

How such tracing may be performed in a network is for instance described in 3GPP TS 32.421 V7.2.0 (2006-09), 3GPP TS 32.422 V7.2.0 (2006-12) and 3GPP TS 32.423 V7.4.0 (2006-12).

However, the analysis of log data that is the result of such a tracing need often be done in access network management devices and not in core network management devices. It is therefore of interest to initiate such a tracing from access network management devices. This is today not possible to do in a simple way. Today, when performing such a tracing, initiation of the tracing needs to be done in a core network management device, which thus is different from the management device that is used for the analysis of the trace log data.

Today a user of an access network management device who desires to log data has to initiate the tracing in another network management device than this user normally works with. This is time consuming and cumbersome, and can easily go wrong.

The network user that needs to start a tracing may be a radio network optimizer (or at least a person working with the access network). However, trace activation requires activation from the core network section, which is in most cases managed by a separate low level core network management device (and thus by another user).

The reason for the tracing having to be activated via the core network section, i.e. so-called signalling based activation, is that because of security reasons the identities used for the wireless terminal and subscription are not known in the access network section. Instead, the trace initiation is provided via the core network section, where a trace reference number that can be used in the access network section is allocated instead of the disallowed identities. The mapping between the trace reference and terminal identities can then be done in the core network management device.

It may also be the case that the wireless terminal that needs to be traced is moving, and must be traced in another, roaming operator's, network. Again, the trace initiation needs to be done in another network management device (in another country).

There is therefore a need for a simpler and more user-friendly initiation of tracing the activities of a wireless terminal in a wireless network.

SUMMARY OF THE INVENTION

The present invention is therefore directed towards providing a simpler and more user-friendly initiation of tracing the activities of a wireless terminal in a wireless network.

This is generally solved through sending a request for a tracing regarding a wireless terminal from an access network management device to a core network management device including a user selected permanent wireless network identity associated with this wireless terminal.

One object of the present invention is thus to provide a method for initiating a tracing of the activities of a wireless terminal in a wireless network, which method allows a simpler and more user-friendly initiation of tracing the activities of a wireless terminal in a wireless network.

This object is according to a first aspect of the present invention achieved through a method for initiating a tracing of the activities of a wireless terminal in a wireless network. In the method a user selected permanent wireless network identity associated with a wireless terminal for which a tracing is desired is received in an access network management device provided in relation to an access network section of the wireless network and managing network elements of the access network section. Thereafter a request for a tracing regarding said wireless terminal is sent from the access network management device to a core network management device provided in a core network section of the wireless network.

Another object of the present invention is to provide an access network management device for initiating a tracing of the activities of a wireless terminal in a wireless network, which allows a simpler and more user-friendly initiation of tracing the activities of a wireless terminal in a wireless network.

This object is according to a second aspect of the present invention achieved through an access network management device for initiating a tracing of the activities of a wireless terminal in a wireless network that is provided in relation to an access network section of the wireless network and manages network elements of this access network section. The device includes a user interface, via which a user selected permanent wireless network identity associated with a wireless terminal for which a tracing is desired is received a communication unit for communicating with other devices and entities, and a network trace requesting unit that is configured generate a request for a tracing regarding the wireless terminal, including the user selected permanent wireless network identity, and order the communication unit to send the request to a core network management device in a core network section of the wireless network.

Another object of the present invention is to provide a method for ordering a tracing of the activities of a wireless terminal in a wireless network, which method allows a simpler and more user-friendly initiation of tracing the activities of a wireless terminal in a wireless network.

This object is according to a third aspect of the present invention achieved through a method for ordering a tracing of the activities of a wireless terminal in a wireless network. In this method a core network management device provided in a core network section of the wireless network receives a request for a tracing regarding a wireless terminal from an access network management device, which is provided in relation to an access network section of the wireless network and manages network elements of this access network section. Here the request includes a permanent wireless network identity associated with the wireless terminal for which a tracing is desired. Thereafter network elements of the access network section are automatically ordered to perform tracing regarding the wireless terminal based on the request.

Yet another object of the present invention is to provide a core network management device for ordering a tracing of the activities of a wireless terminal in a wireless network, which allows a simpler and more user-friendly initiation of tracing the activities of a wireless terminal in a wireless network.

This object is according to a fourth aspect of the present invention achieved through a core network management device for ordering a tracing of the activities of a wireless terminal in a wireless network. The core network management device is provided in relation to a core network section of the wireless network and includes a communication unit for communicating with other devices and entities and which receives a request for a tracing regarding a wireless terminal from an access network management device that is provided in relation to an access network section of the wireless network and manages network elements of the access network section. The request includes a permanent wireless network identity that is associated with the wireless terminal for which a trace is desired. The device also includes a network trace management unit that is configured to receive the request from the communication unit and automatically order network elements of the access network section to perform tracing regarding the wireless terminal based on the request.

The present invention has many advantages. It is user-friendly in that it allows initiation of the tracing of the activities of a wireless terminal in a wireless network from an access network management device. The invention furthermore allows tracing to be initiated for other networks if the wireless terminal is located there.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
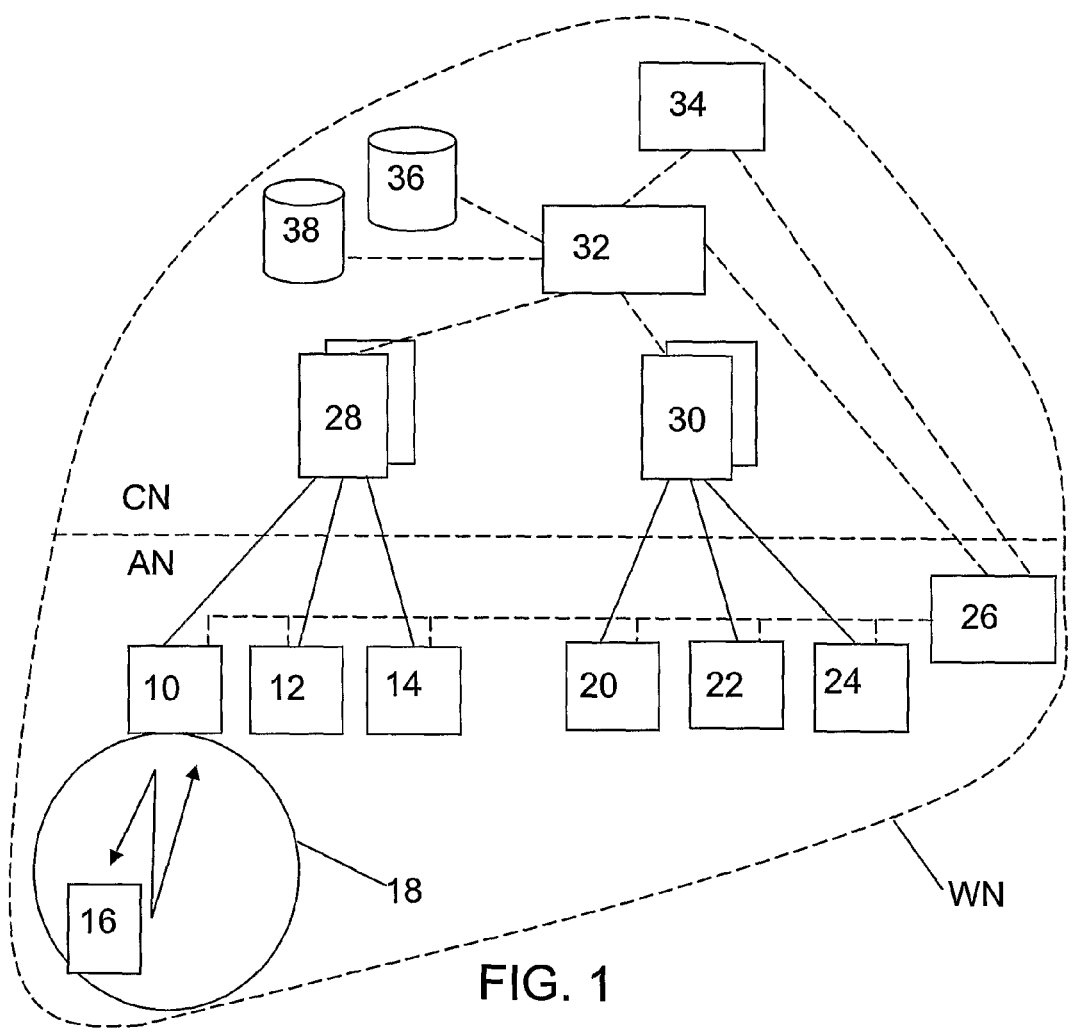
FIG. 1 schematically shows a wireless network comprising an access network section and a core network section.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

The present invention is directed towards initiating of tracing from network management devices that are provided in access network sections of a wireless networks. The present invention will in the following be described in relation to tracing being performed in an LTE (Long Term Evolution) network. It should however be realised that the present invention is not limited to LTE networks but may be provided in any wireless network such as UMTS (Universal Mobile Telecommunications), GSM (Global System for Mobile communications) and WLAN (Wireless Local Area Network).

The present invention will now be described in more detail in the non-limiting example context of a wireless network WN that is in the form of an LTE network, which is shown in a simplified form in FIG. 1. The wireless network WN is divided into a core network section CN and an access network section AN, which separation is indicated by a horizontal dashed line in FIG. 1. The core network section CN includes network elements in the form of a first pool of communication setup devices 28 and a second pool of communication setup devices 30 These communication setup devices 28 and 30 are responsible for providing communication and are normally provided as routers that route traffic to an from the access network section AN. Traffic is here provided as packet based traffic. In the core network section CN there is furthermore provided a low level core network management device 32, which is responsible for operation and maintenance (O & M) for network elements in the core network section CN, for instance routers from one specific supplier, which may be from the company Ericsson. Thus it should be realised that there may be several such low level core network management devices 32, at least one for each supplier of network elements in the network. Depending on the complexity of the network WN there may furthermore be more than one such low level core network management device for the same supplier. These low level core network management devices are often called SNM (Sub Network Manager), NEM (Network Element Manager) or EMS (Element Management System). There is furthermore provided a high level core network management device 34, which is responsible for network management of network elements independently of their origin. This device 34 works on a higher abstraction level than the low level core network management device 32 and also coordinates data from several low level core network management devices. This device 34 is often called NMC (Network Management Center). In the core network section CN there is furthermore provided a Home Subscriber Server HSS 36 and a Visitor Location Register VLR 38, where information about wireless terminals is kept. These are thus databases about wireless terminals in the network WN. The HSS 36 here keeps information about wireless terminals that are associated with the network, where a user of a wireless terminal may have a subscription to the use of the network, while the VLR 38 includes information about wireless terminals associated with other networks that are visiting the network. These are used in the routing of traffic to and from wireless terminals. However they are also used in the initiating of tracing, as will be described in more detail later.

Each pool of connection setup devices 28 and 30 is furthermore connected to a group of network elements in the form of wireless access point handling devices, which are here in LTE provided as eNBs (evolved NodeB). In FIG. 1 there is shown a first, second and third wireless access point handling device 10, 12 and 14 connected to the first pool of communication setup devices 28 and a fourth, fifth and sixth wireless access point handling device 20, 22 and 24 connected to the second pool of communication setup devices 30. Each wireless access point handling device here handles a geographical area in the form of a cell, via which wireless terminals may communicate with the wireless network. Here it should be realised that one wireless access point handling device may handle more than one cell. In the figure only one cell 18 associated with the first wireless access point handling device 10 is shown. The cells are all provided in a geographical area covered by the access network section AN. Wireless access point handling devices are within these types of networks base stations which in the case of LTE are enhanced and also include base station controller functionality. In other types of networks, like UMTS and GSM, these are separate network elements. In FIG. 1 one wireless terminal 16 is shown in the cell 18 handled by the first wireless access point handling device 10 in the access network section AN and shown as communicating with this first wireless access point handling device 10. It should be realised that normally there may be provided several wireless terminals communicating with a wireless access point handling device. There is furthermore shown an access network management device 26 provided in the access network section AN that is responsible for operation and maintenance (O & M) for network elements in the access network section AN. Also here there may be several such devices for manufacturers of different network elements in the access network section AN. This device is similar to the low level core network management device. The only difference between the access network management device 26 and the low level core network management device 32, apart from the obvious differences resulting because of the different nature of the network elements they are serving, is in many aspects only the network section they are provided in. Therefore the same terminology is often used for these network management devices. In FIG. 1 connections between the network management devices and the other entities of the network are shown with dashed lines as opposed to the connection between communication setup devices and wireless access point handling devices in order to differentiate between actual traffic and operation and maintenance. The wireless access point devices are thus network elements that are managed by the access network management device 26, while the connection setup devices 28 and 30 are network elements managed by the low level core network management device 32.

Figure 2:
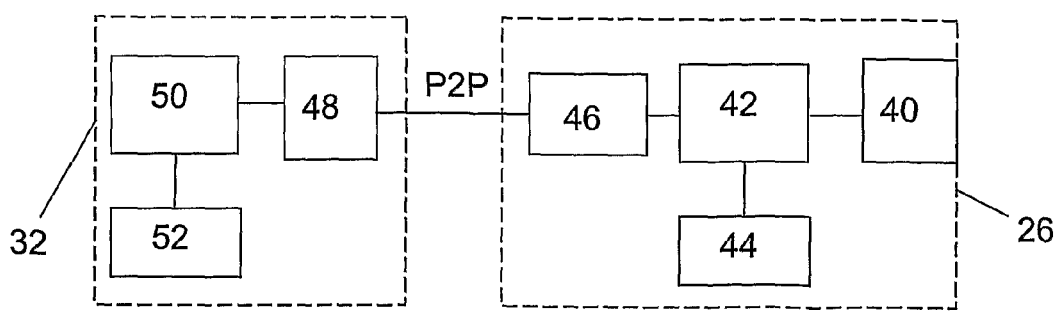
FIG. 2 shows a block schematic of an access network management device which is communicating with a low level core network management device.

FIG. 2 shows a block schematic of the access network management device 26 and the low level core network management device 32. These devices are here furthermore shown as communicating with each other using a peer-to-peer interface P2P. The access network management device 26 includes a user interface 40, which may include a keyboard and display and is connected to a network trace requesting unit 42. The network trace requesting unit 42 is furthermore connected to a first store 44 and to a first communication unit 46 for communication with other entities inside and outside the wireless network WN. The low level core network management device 32 includes a second interface 48, also provided for communication with other entities inside and outside the wireless network WN. The second communication unit 48 is in turn connected to a network trace management unit 50. The network trace management unit 50 is finally connected to a second store 52.

Tracing of the activities of wireless terminals is important for many reasons. This may be necessary in order to obtain information about how different network elements are functioning as well as of how wireless terminals are functioning. They are also used for troubleshooting purposes. Information that may be of interest is information like information about dropped calls and dropped handovers between different access points.

The ordering of such tracing in these wireless networks has to be performed from the core network section CN because of security reasons. However, the devices that normally need such tracing are in many instances the access network management devices. Today there exist no simple way to initiate such tracing from the access network. The present invention is therefore directed towards simplifying such initiating of tracing.

Figure 3:
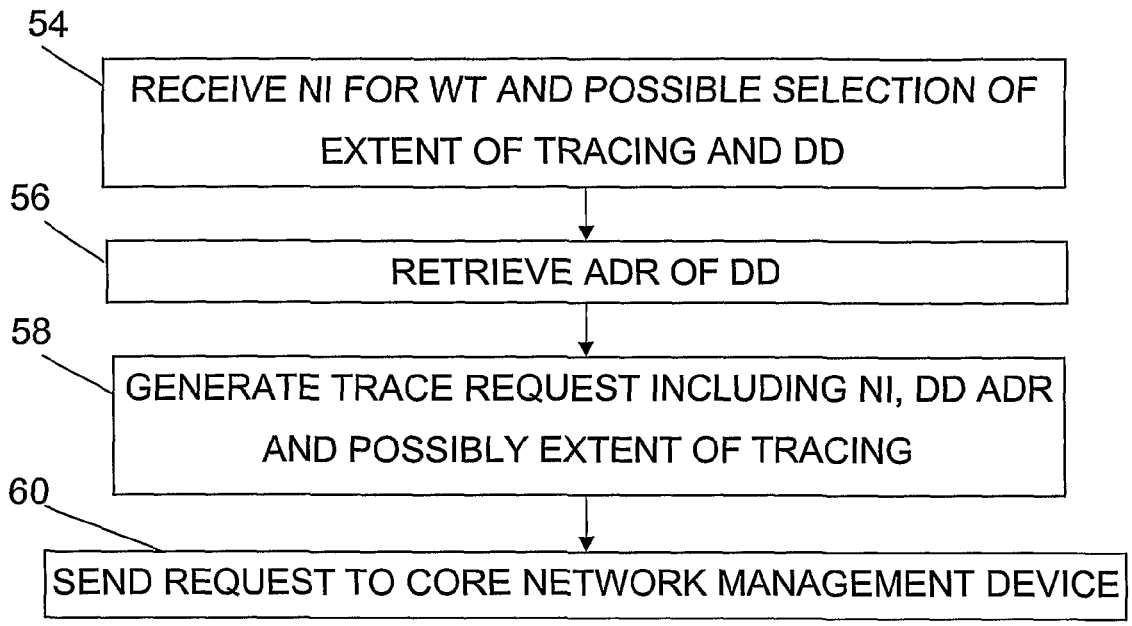
FIG. 3 shows a flow chart of a number of general method steps according to the invention taken in the access network management device.
Figure 4:
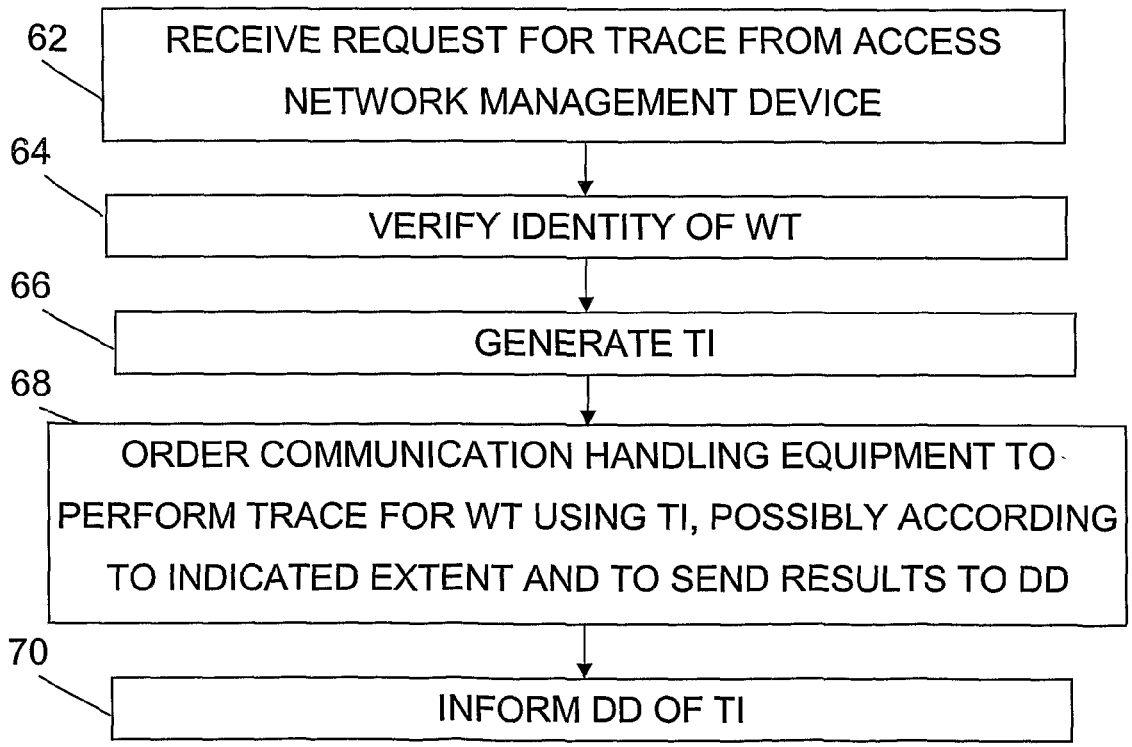
FIG. 4 shows a flow chart of a number of general method steps according to a first variation of the present invention taken in the low level core network management device.
Figure 5:
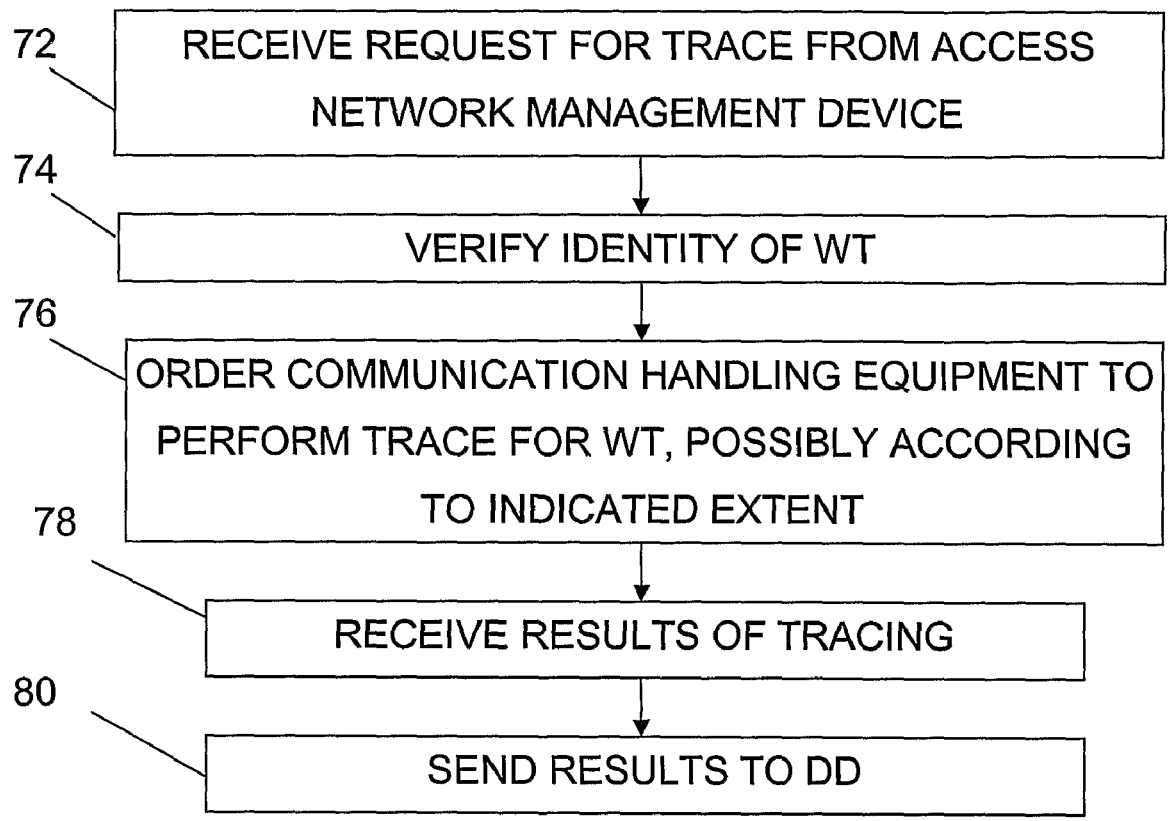
FIG. 5 shows a flow chart of a number of general method steps according to a second variation of the present invention taken in the low level core network management device.

Now the initiating and ordering of tracing to be performed according to a first variation of the present invention will be described with reference being made to FIGS. 1, 2, 3 and 4, where FIG. 3 shows a flow chart of a number of general method steps according to the invention taken in the access network management device and FIG. 4 shows a flow chart of a number of general method steps according to a first variation of the present invention taken in the low level core network management device.

It all starts with an operator of the access network management device 26 wanting to trace the activities of a wireless terminal, for instance wireless terminal 16 in FIG. 1. He/she may then start a trace initiating application that is provided by the network trace requesting unit 42 of the device 26. In this application he/she may furthermore be presented with the possibility to enter some necessary data via the user interface 40. In order to do this he has to have knowledge of a permanent wireless network identity (NI) associated with the wireless terminal (WT) 16. This identity may be an identity that is directly associated with the terminal in question, such as an IMEI (International Mobile Equipment Identity). However it may also be an identity that belongs to the user of the wireless terminal (WT), such as an identity associated with a subscription to the services of the network. This type of identity may belong to a SIM card being inserted in the wireless terminal, a so-called IMSI (International Mobile Subscriber Identity). In the simplest form of the invention an identity associated with the wireless terminal is all the data the user may have to enter via the user interface 40. However he may also be presented with some further possibilities, like to indicate the extent of the tracing and a possible trace log data handling destination device (DD) that is to receive log data resulting from the performed tracing. The trace log data handling destination device may be the access network management device 26, in which case there may be no need to make an indication of destination device. There may also exist a possibility to select a number of different trace log data handling destination devices, as well as a possibility for the user to enter information that enables the identification of a suitable trace log data handling destination device. He/she may for instance be presented with a list of names of such trace log data handling destination devices. It is furthermore possible that the tracing is to cover all activities of the wireless terminal, in which case there may be no need for indicating the extent. The user interface 40 thus receives the network identity of the wireless terminal together with a possible selection of the extent of the tracing and a destination device selection, step 54. This information is then forwarded to the network trace requesting unit 42.

The network trace requesting unit 42 then retrieves an address of the trace log data handling destination device based on the entered data, step 56, which address is stored in the first store 44. In case no destination device was indicated or in case the access network management device was selected as destination device by the user, then the address is the address of the access network management device 26. This address would of course not be retrieved if the user had entered a trace log data handling destination device address directly. The address is normally provided in the form of an IP (Internet Protocol) address. Thereafter the network trace requesting unit 42 generates a request for a tracing of the activities of the selected wireless terminal 16, step 58. This request then includes the network identity, destination device address and data indicating the extent of tracing in case the user had submitted such an indication. The request may also include a time period within which the request is applicable and/or a starting and/or an end time for the applicability of the tracing. As an alternative there may exist a default setting in the system of how long traces are applicable, which all network management devices and network elements know about. Thereafter the request is sent to the low level core network management device 32 via the first communication unit 46 over the peer-to-peer interface P2P, step 60. The request including the address may be sent using a management protocol, like SNMP (Simple Network Management Protocol), CORBA (Common Object Request Broker Architecture) or SOAP (Simple Object Access Protocol). It is also possible to send a request to end a trace at a later time from the access network management device 26.

Since there can be different suppliers or the network may be very large, the request may be sent to several low level core network management devices. However, in order to keep the description of the present invention simple, a request will in the following only be described in relation to being sent to one low level core network management device. A request may as an alternative be sent to the high level core network management device 34, which takes care of the handling of the request instead.

The request is then received by the second communication unit 48 of the low level core network management device 32, step 62, from where it is forwarded to the network trace management unit 50. The network trace management unit 50 then verifies the device identity, step 64, which is done through investigating the HSS 36 and/or the VLR 38 via the second communication unit 48 in order to make sure that the wireless terminal 16 is located in the network WN. In case it is not, but belongs to the network WN, the request for a trace is forwarded to another network. It may also involve finding out an IMEI from an IMSI or vice versa to be used in the tracing. After the identity has been verified, the network trace management unit 50 generates a trace identity (TI), step 66, and then automatically orders the relevant network elements (10, 12, 14, 20, 22, 24) to perform a tracing of the activities of the wireless terminal 16, step 68. In this variation of the present invention, the order includes an identity associated with the wireless terminal, i.e. either an IMEI or an IMSI or equivalent identifiers, the trace identity, the trace log data handling destination device address and possibly also information about the extent to which the trace is to be performed. In this first variation of the invention the order also includes an instruction to send log data, i.e. the results of the tracing to the trace log data handling destination device that is identified by the destination device address in order to ensure that the destination device receives the trace log data. This may be done through sending the request to one or more of the pool of connection setup devices which in turn order their connected wireless access point handling devices to perform tracing of the activities of the wireless terminal. Finally the network trace management unit 50 informs the trace log data handling destination device, which may thus be the access network management device 26, of the trace identity used for the trace, step 70, via the second communication unit 48.

Thereafter the activities of the wireless terminals 16 are traced and logs including log data regarding these activities are created in the different network elements according to the extent indicated. Logs are here created as soon as the wireless terminal 16 is engaged in some activity. No logging takes place if it is not active. Here each access point handling device 12, 14, 16, 20, 22, 24 logs data about the wireless terminal in case it is active in relation to it, for instance based on handovers from node to node or when traffic is received and sent to and from the wireless terminal 16 via the corresponding access point. The log data, which may include information, such as information about the speech quality and events that have occurred (like a dropped call or a handover) is then stored using the same trace identity in all the network entities where a log is created. Other activities that can take place and be logged are location updating and periodic updates. Thereafter when tracing is to be ended, which may thus be based on a pre-set time having lapsed, having received a stop tracing order from the low level core network management device 32 or through having determined that an indicated duration provided in the order having lapsed, the log data is sent to the destination device from all these network elements using the destination device address. Here the log data is only accompanied by the trace identity, because the network elements are for security reasons normally not allowed to use the identity of the wireless terminal in communication. The destination device may then analyse the log data.

Now a second variation of the present invention will be described with reference being made to FIGS. 1, 2, 3 and 5, where the latter figure shows a flow chart of a number of general method steps according to this second variation of the present invention taken in the low level core network management device 32.

As in the first variation an operator of the access network management device 26 enters a permanent wireless network identity (NI) associated with the wireless terminal (WT) 16, possibly together with the extent of the tracing and a possible indication of a trace log data handling destination device (DD) to the network trace requesting unit 42 via the user interface 40, step 54. The network trace requesting unit 42 then retrieves the address of the destination device from the first store 44, step 56, generates a request for a tracing relating to the selected wireless terminal, where the request includes the network identity, destination device address and data indicating the extent of tracing in case the user had submitted such an indication, step 58. Thereafter the request is sent to the low level core network management device 32 via the first communication unit 46 over the peer-to-peer interface P2P, step 60.

The request is also here in the second variation received by the second communication unit 48 of the low level core network management device 32, step 72, and forwarded to the network trace management unit 50. The network trace management unit 50 again verifies the device identity, step 74, generates a trace identity and automatically orders the relevant network elements to perform a tracing regarding the wireless terminal, step 76. The trace identity is also stored in the second store 52 for later use. It may here be stored together with the destination device address and possibly also together with the received wireless terminal identity. In this variation of the present invention, the order as earlier includes an identity of the wireless terminal, the trace identity, the destination device address and possibly also information about the extent to which the trace is to be performed. However, there is no order to send log data, i.e. the results of the tracing to the destination device address. It is however possible that the destination device is informed of the trace identity. Instead the network elements report their results of the tracing to the low level core network management device 32. An instruction to report the results may be explicitly included in the order, or these elements may be pre-programmed to always send the log results to the low level core network management device 32. As before the request may be sent to one or more of the pool of connection setup devices, which in turn order their connected wireless access point handling devices to perform tracing of the activities of the wireless terminal.

When logging is then performed in the different network elements, each access point handling device 12, 14, 16, 20, 22, 24 logs data about the wireless terminal 16 in case it is active in relation to it, for instance based on handovers from node to node or various traffic being transferred between the wireless terminal and the network via it. Log data is then stored in the network element using the same trace identity. Thereafter when tracing is to be ended, the log data is sent to the low level core network management device 38. The network management unit 50 of the low level core network management device 38 therefore receives the results of the tracing, step 78, in the form of the log data which is accompanied by the trace identifier. Based on the trace identifier it then fetches the destination device address as well as possibly the wireless terminal identifier and thereafter sends the results of the tracing to the destination device via the second communication unit 48, step 80, in order for the destination device to be able to analyse the log data. In this way it ensures that the destination device receives the trace log data. It is here possible that the low level core network management device 32 gathers all log data from the different network elements before it is sent to the destination device.

It should here be realised that the first and second variation described above may be combined in the same network, in that some network elements associated with one low level core network management device may send log data directly to the destination device, whereas other that are associated with another low level core network management device may send log data to this low level core network management device, which in turn sends the log data to the destination device.

The extent of tracing can be defined in some different ways. It is possible that a tracing can be requested for the whole network or be limited to a part of the network, for instance to all or some of the access point handling devices connected to one or a limited number of pool of connection setup devices. In this case the request for a tracing sent to a core network management device would include data regarding a part of the wireless network where the tracing should be carried out. It is also possible to limit the tracing to only some type of activities of the wireless terminal or to some type of data, such as for instance only dropped connections or missed handovers. In this case the request for a tracing sent to a core network management device would include an indication of the type of wireless terminal activities and/or data to be logged.

The peer-to-peer connection may be provided through each network management device having a manager object communicating with a proxy object provided in the corresponding network management device with which communication is performed. These proxy objects may be provided as border objects that communicate with each other in the different network management devices. More details of this type of communication may be found in 3GPP TR 32.806 V7.0.0 (2006-06), which is herein incorporated by reference.

As mentioned before the destination device may be the same device that initiated the tracing of log data. In case this is the only option provided for the user, it is not necessary to allow the user to enter information allowing an address to be found. The address may thus be selected automatically. The request does then furthermore not have to include an address, since in IP communication this address is provided in the data packets in which the request is sent. Also the network elements in the access network section may know about the address beforehand, because the access network management device is the management device they normally communicate with. In this case they may be configured to always send log data to this access network management device. However, when the destination device is another device, this address normally has to be included. However it is also possible that only an identifier is included, which allows the core network management device to locate the correct destination device. The destination device may be another access network management device in the same or in another network. It may furthermore be the high level core network management device. It can furthermore be a completely different device, for instance a separate device, like a PC, including a separate script or post processing tool specialised for this purpose, such as TEMS™. The device may also be a database.

The method steps and activities performed by the low level core network management device that were described above may as an alternative be performed by the high level core network management device.

The present invention has many advantages. It is user-friendly in that it allows initiation of the tracing of the activities of a wireless terminal in a wireless network from an access network management device. The invention furthermore allows tracing to be initiated for other networks if the wireless terminal is located there. The invention furthermore provides a unified delivery of trace results to a destination device. This is furthermore possible in an environment where there are several different network management devices that are only managing some network elements. It also allows flexibility in that different destination devices may be selected. In this way a destination device that is specialised in analysing such trace results may be selected as a destination device.

The network management devices according to the present invention can be implemented through one or more processors together with computer program code for performing the functions of the invention. The program code mentioned above may also be provided as a computer program product, for instance in the form of a data carrier carrying computer program code for performing the method according to the present invention when being loaded into a network management device.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method for initiating a tracing of the activities of a wireless terminal in a wireless network comprising the steps of:
   receiving, in an access network management device provided in relation to an access network section of the wireless network and managing network elements of said access network section, a user selected permanent wireless network identity associated with a wireless terminal for which a tracing is desired,
   sending a request for a tracing regarding said wireless terminal from said access network management device to a core network management device provided in a core network section of the wireless network.

2. The method according to claim 1, wherein said request comprises data regarding a part of the wireless network where the tracing should be carried out.

3. The method according to claim 1, wherein said request comprises an indication of a type of wireless terminal activities and/or data to be logged.

4. The method according to claim 1, wherein said request is sent over a peer-to-peer interface provided between the two network management devices.

5. The method according to claim 1, further comprising the step of receiving, in said access network management device, trace log data associated with said request regarding said wireless terminal.

6. The method according to claim 1, wherein the request comprises an address of a destination trace log data handling device that is to receive trace log data associated with said request.

7. An access network management device for initiating a tracing of the activities of a wireless terminal in a wireless network, provided in relation to an access network section of the wireless network and managing network elements of said access network section, comprising:
   a user interface for receiving a user selected permanent wireless network identity associated with a wireless terminal for which a tracing is desired,
   a communication unit for communicating with other devices and entities, and a network trace requesting unit configured to
   generate a request for a tracing regarding said terminal, where said request includes said user selected permanent wireless network identity, and
   order said communication unit to send said request to a core network management device provided in a core network section of the wireless network.

8. A method for ordering a tracing of the activities of a wireless terminal in a wireless network comprising the steps of:
   receiving, in a core network management device provided in a core network section of the wireless network, a request for a tracing regarding a wireless terminal from an access network management device provided in relation to an access network section of the wireless network and managing network elements of said access network section, and automatically ordering, based on said request, network elements of the access network section to perform tracing regarding said wireless terminal, wherein said request comprises a permanent wireless network identity associated with the wireless terminal for which a tracing is desired.

9. The method according to claim 8, further comprising the step of verifying the identity in at least one database of wireless terminals in the network and performing the step of ordering based on said verification.

10. The method according to claim 9, wherein the step of verifying the permanent wireless network identity comprises locating, based on the received identity, a related permanent wireless network identity of the wireless terminal in said database that is suitable for use in performing tracing by the network elements.

11. The method according to claim 8, wherein said step of automatically ordering network elements of the access network to perform tracing includes ordering tracing to be performed to an extent that is indicated in the request.

12. The method according to claim 11, wherein said request comprises data regarding a part of the wireless network where the tracing should be carried out and the step of ordering comprises only ordering network elements provided in said part of the wireless network to perform tracing.

13. The method according to claim 11, wherein said request comprises an indication of a type of wireless terminal activities and/or data to be logged and the step of ordering comprises ordering network elements to only provide trace log data regarding the indicated type of activities and/or data.

14. The method according to claim 8, wherein said request is received over a peer-to-peer interface provided between the two network management devices.

15. The method according to claim 8, wherein the request comprises an address of a destination trace log data handling device that is to receive trace log data associated with said request.

16. The method according to claim 15, further comprising the step of ordering the network elements to provide trace log data regarding the wireless terminal to the destination trace log data handling device having said address.

17. The method according to claim 8, further comprising the step of receiving, in said core network management device, trace log data associated with said request regarding said wireless terminal from said network elements and sending this trace log data to the destination trace log data handling device.

18. A core network management device for ordering a tracing of the activities of a wireless terminal in a wireless network provided in relation to a core network section of the wireless network and comprising:

a communication unit for communicating with other devices and entities and for receiving a request for a tracing regarding a wireless terminal from an access network management device provided in relation to an access network section of the wireless network and managing network elements of said access network section, and a network trace management unit configured to
receive said request from the communication unit, and
automatically order, based on said request, network elements of the access network section to perform tracing regarding said wireless terminal, wherein said request comprises a permanent wireless network identity associated with the wireless terminal for which a trace is desired.

* * * * *